US007625671B2

(12) United States Patent
Amatucci

(10) Patent No.: US 7,625,671 B2
(45) Date of Patent: *Dec. 1, 2009

(54) TRANSITION METAL FLUORIDE: CARBON NANOAMALGAM RECHARGEABLE BATTERY CELL ELECTRODE MATERIAL

(75) Inventor: Glenn G. Amatucci, Peapack, NJ (US)

(73) Assignee: Rutgers, The State University, New Brunswick, NJ (US)

( * ) Notice: Subject to any disclaimer, the term of this patent is extended or adjusted under 35 U.S.C. 154(b) by 836 days.

This patent is subject to a terminal disclaimer.

(21) Appl. No.: 10/261,863

(22) Filed: Oct. 1, 2002

(65) Prior Publication Data
US 2004/0062994 A1 Apr. 1, 2004

(51) Int. Cl.
*H01M 4/62* (2006.01)
(52) U.S. Cl. .................... 429/226; 429/231.8
(58) Field of Classification Search ............ 429/231.95, 429/221, 223, 224, 225, 220, 232, 226, 231.8; 252/182.1; 423/490
See application file for complete search history.

(56) References Cited

U.S. PATENT DOCUMENTS 3,918,988 A * 11/1975 Abens ..................... 429/343
5,759,720 A   6/1998 Amatucci 2002/0086208 A1 * 7/2002 Hayashi et al. .......... 429/218.1
2002/0168573 A1   11/2002 Baker et al.

FOREIGN PATENT DOCUMENTS

EP    1049182    11/2000

OTHER PUBLICATIONS

Roth M. and R. Hempelmann, "Nanocrystalline LiF via microemulsion systems", J. Mater. Chem., vol. 9, pp. 439-497 (1999).
Badway, F., et al., "*Carbon Metal Fluoride Nanocomposites*," Journal of the Electrochemical Society, vol. 150, No. 9, pp. A1209-A1218 (2003).
Badway, F., et al., "Carbon Metal Fluoride Nanocomposites," Journal of the Electrochemical Society, vol. 150, No. 10, pp. A1318-A1329 (2003).

* cited by examiner

*Primary Examiner*—Patrick Ryan
*Assistant Examiner*—Monique Wills
(74) *Attorney, Agent, or Firm*—Greenberg Traurig, LLP

(57) ABSTRACT

A safe and economical electrochemically active material useful in rechargeable battery cell electrode compositions comprises a nanostructure amalgam of a transition metal fluoride and carbon. The nanoamalgam may be prepared by subjecting a precursor mixture of a transition metal fluoride, such as $FeF_3$, and carbon to extreme, high energy impact comminution milling which results in the conversion of the mixture to a unique and distinct nanostructure material. When incorporated as active electrode material in lithium battery cell fabrications, the nanoamalgam enables the attainment of stable specific discharge capacities in the range of 250 to 500 mAh/g.

8 Claims, 9 Drawing Sheets

TRANSITION METAL FLUORIDE: CARBON NANOAMALGAM RECHARGEABLE BATTERY CELL ELECTRODE MATERIAL

BACKGROUND OF THE INVENTION

The present invention relates to rechargeable electrochemical energy storage systems, particularly to such systems, such as battery cells, comprising materials capable of reversibly taking up and releasing lithium ions as a means of storing and supplying electrical energy. More specifically, the invention relates to the formation and utilization of nanostructure transition metal fluoride:carbon amalgams, or nanoamalgams, as active electrode component materials in fabricating electrochemical cells, such as lithium battery cells, capable of exhibiting high specific capacity at high recharge rates.

During the course of development of rechargeable electrochemical cells, such as lithium and lithium-ion battery cells and the like, numerous materials capable of reversibly accommodating lithium ions have been investigated. Among these, occlusion and intercalation materials, such a carbonaceous and graphitic compounds, and transitions metal oxide spinels, have proved to be particularly well-suited to such applications. However, even while performing reasonably well in such recycling electrical storage systems of significant capacity, many of these materials exhibit detrimental properties, such as marginal environmental compatibility and safety, which detract from the ultimate acceptability of the rechargeable cell devices. In addition, some of the more promising materials are available only at costs which limit their widespread utilization.

Materials of choice in the fabrication of rechargeable battery cells, particularly highly desirable and broadly implemented Li-ion cells, have for some considerable time centered upon graphitic negative electrode compositions which provide respectable capacity levels in the range of 300 mAh/g. Complementary positive electrode materials in present cells comprise the less effective layered intercalation compounds, such as $LiCoO_2$ which generally provides capacities in the range of 150 mAh/g. Alternative such intercalation materials, such as $LiNiO_2$ and $LiMn_2O_4$, have more recently gained favor in the industry, since, although exhibiting no greater specific capacity, these compounds are available at lower cost and, further, provide a greater margin of environmental acceptability.

Due to the increasing demand for ever more compact electrical energy storage and delivery systems for all manner of advancing technologies, from biomedical to telecommunications, the search continues for battery cell materials capable, on the one hand, of providing greater specific capacity over wider ranges of cycling speeds, voltages, and operating temperatures while, on the other hand, presenting fewer environmental hazards and greater availability at lower processing and fabrication costs. Searches for more effective positive electrode materials in particular have become far-reaching with attention turning more frequently to the abundant lower toxicity transition metal compounds which are typically accessible at economical costs.

In this latter respect compounds of iron, e.g., iron oxides, attracted some past attention. However, although exhibiting electrochemical activity, iron oxides were found to function appropriately only at voltages which are too low for practical implementation in rechargeable lithium and lithium-ion battery cells. Upon further consideration of the economic advantages possibly attainable in transition metal compounds, interest shifted to examination of the more active fluoride compounds. Investigations into such use of these fluorides confirmed, however, that, while the open structures of the transition metal fluorides support the good ionic conductivity essential, in part, for useful electrode performance, the large band gap induced by the highly ionic character of the metal: halogen bond results in poor electronic conductivity in these materials. Without this latter essential conductive property to complement proven ionic conductivity, the transition metal fluorides were considered virtually useless as lithium battery electrode materials.

Despite the inconsequential performance of the transition metal fluorides in typical rechargeable cell fabrications, the theoretical promise of output voltages in the range of 3 V, due to the high ionicity of the compound bonds, prompted some further investigations into metal halides for use in electrode compositions. Arai et al., for example, in *J. Power Sources*, 68, 716-719 (1997), initially reported the use of iron trifluoride ($FeF_3$) in an electrode composition comprising the admixture of about 25 parts acetylene black to 70 parts of $FeF_3$ in an attempt to provide the necessary electronic conductivity. The performance of such a cell, despite the impractically low charge/discharge rate which extended over a 60 hour cycle period, was marginal at a discharge capacity over 4.5 to 2.0 V of only about 80 mAh/g vis-à-vis a theoretical ($1e^-$ transfer) capacity of 237 mAh/g. Subsequent independent fabrication and testing of similar battery cells at more realistic 4 hour cycle rates would yield no more than about 50 mAh/g.

SUMMARY OF THE INVENTION

The present invention provides the means for realizing the potential improvement in rechargeable electrochemical battery cell systems which takes advantage of the low cost and desirable environmental compatibility of transition metal fluoride compounds to achieve cells providing stable and surprisingly high capacity at rapid cycle rates over broad voltage ranges. The heretofore unacceptably low level of electronic conductivity exhibited by electrochemical cell electrode compositions comprising transition metal fluorides has been resolved through the formation of a novel transition metal fluoride:carbon nanoamalgam in a preferred implementation of extreme, high impact energy comminution of a mixture of a transition metal fluoride compound and carbon. The resulting nanostructure material, such a material being typically defined as having a predominant particle size of significantly less than 100 nm, comprises particles, or crystallites, of less than about 50 nm, preferably less than about 40 nm, and yields metal fluoride nanodomains exhibiting the high ionicity and ion conductivity of the fluoride compound while providing high electronic conductivity through an electron tunneling phenomenon supported in an interconnection of the nanodomains by the highly conductive carbon incorporated into the nanoamalgam material.

The transition metal fluoride:carbon nanoamalgams of the invention may be employed in the manner of prior rechargeable electrochemical cell fabrication compositions and methods as the electroactive material of positive cell electrodes. Likewise, the negative electrode members of such cells may advantageously comprise any of the widely used lithium ion source materials, such as lithium metal, lithium alloys, e.g., LiAl, lithiated carbon, and lithiated metal nitrides. These nanoamalgam electrode materials also function well with most other prior cell composition components, including polymeric matrices and adjunct compounds, as well as with commonly used separator and electrolyte solvents and solutes.

Transition metal fluoride compounds which have exhibited significant utility in the present invention include those of first row transition metals, such as Fe, Co, Ni, as well as substituted derivatives thereof. Thus, compounds such as $FeF_2$, $FeF_3$, $CoF_2$, $NiF_2$, and $(NH_4)_xMe_yF_z$, where Me is a transition metal, $1 \leq x \leq 4$, $1 \leq y \leq 2$, and $4 \leq z \leq 6$, may be employed in the formation of the active electrode nanoamalgam when processed, according to the invention, with most commercial electrochemical cell grade carbons, such as acid-treated expanded graphite, activated carbon, and graphene chain conductive carbon black. While optimization of nanoamalgam component ratios is well within the non-inventive purview of the knowledgeable artisan, good results in cell performance may generally be obtained from nanoamalgams comprising from about 5% by weight of a carbon component to about 50% at which point the overall specific capacity of a cell may become impaired mathematically simply by the excessive weight of extraneous carbon component.

Nonaqueous electrolyte solutions commonly used in prior rechargeable electrochemical cell fabrication serve equally well in the cells of the present invention. These electrolyte compositions may thus comprise lithium salts such as $LiPF_6$, $LiBF_4$, $LiClO_4$, and the like, dissolved in the usual cyclic and acyclic organic solvents, such as ethylene carbonate (EC), dimethyl carbonate (DMC), propylene carbonate (PC), ethyl methyl carbonate (EMC), and mixtures thereof. As with the optimization of the nanoamalgam materials, specific combinations of electrolyte components will be a matter of preference of the cell fabricator, although consideration may be given to the use of solutes such as $LiBF_4$ which appear less susceptible during cell cycling to hydrolytically forming HF which could affect the optimum performance of some metal fluorides. For such a reason, for instance, a $LiBF_4$:PC electrolyte may be preferred over one comprising a long-utilized standard solution of $LiPF_6$ in a mixture of EC:DMC.

BRIEF DESCRIPTION OF THE DRAWING

The present invention will be described with reference to the accompanying drawing of which.

DESCRIPTION OF THE INVENTION

Figure 1:
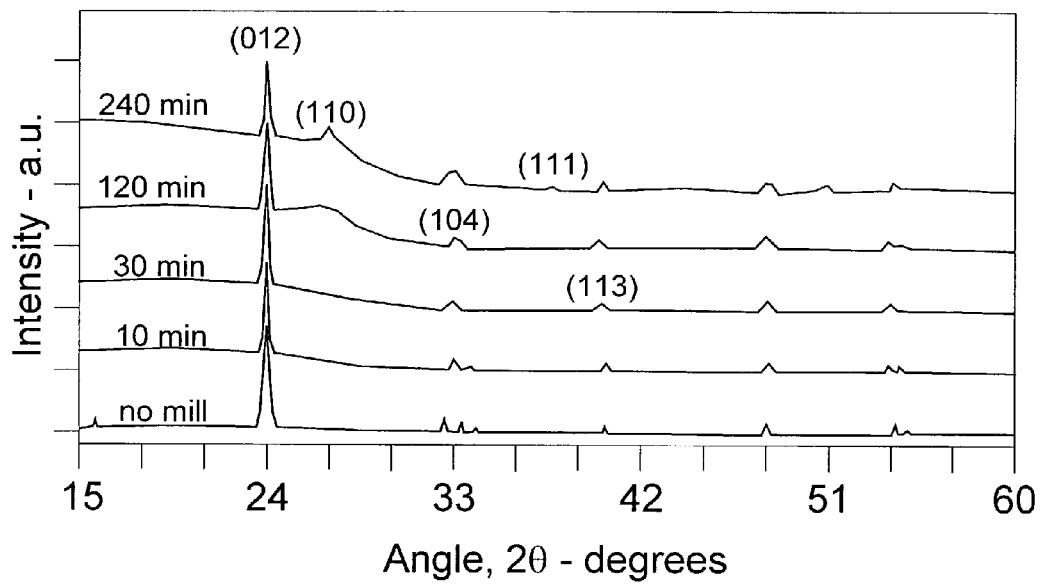
FIG. 1 depicts overlaid representations of XRD traces of transition metal fluoride:carbon nanoamalgam samples obtained from varying durations of high energy impact milling.
Figure 2:
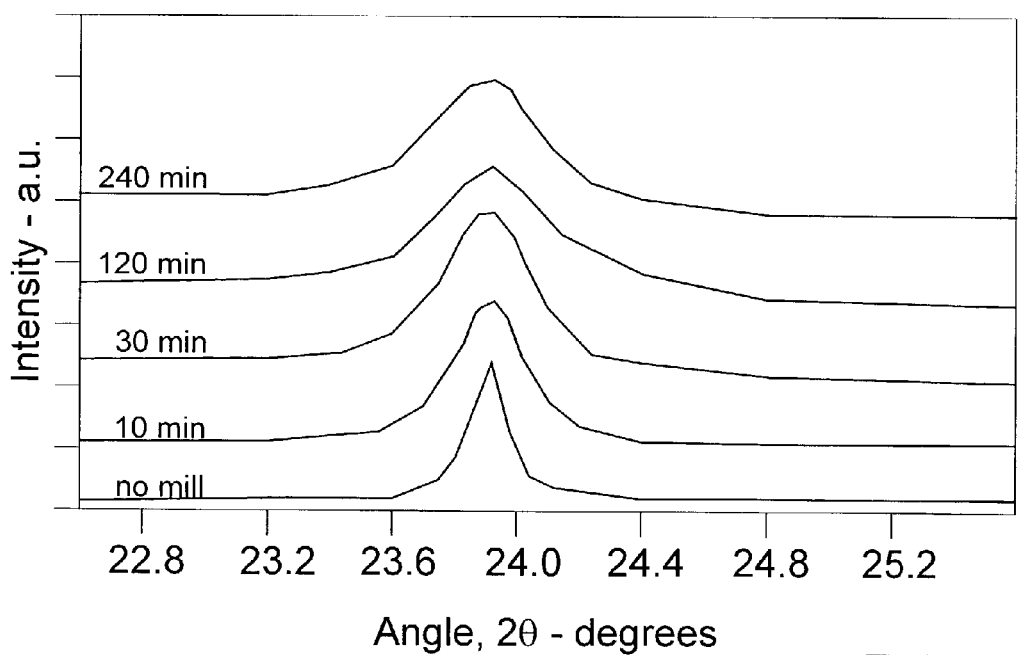
FIG. 2 depicts a section the traces of FIG. 1 in expanded scale highlighting the characteristic broadening of the major trace peak as a function of duration of such milling.

The novel transition metal fluoride:carbon nanoamalgam materials provided by the present invention yield safe, economical, and highly effective rechargeable electrochemical cell electrode materials which far outperform the simple mixtures of carbon and metal halides previously suggested by Arai et al., noted above. The complementary high ionic and electronic activities of the amalgam nanodomains hitherto unattainable by attempted carbon mixture enhancement of the inherent electronic insulative property of otherwise ionically active metal halide compounds enable the remarkable high cycle rates, voltage ranges, and discharge capacities achieved with rechargeable cells of this invention.

In the presently preferred method of preparing the transition metal fluoride:carbon nanoamalgam electrode materials, mixtures of selected transition metal fluoride and carbon components are subjected to extreme, high energy comminution in an impact mixer/mill such as the commercially available SPEX 8000 device (SPEX Industries, Edison N.J., USA). Unlike the shearing action of conventional planetary, roller, or ball mills which at best may provide size reduction to the micrometer range, the extremely high energy impact action impressed upon the component mixture by the impact mill provides, within milling periods as short as about 10 minutes, a particle size reduction of the processed material to the nominal nanostructure range of less than about 100 nm. Further milling for as little as 30 minutes up to about 4 hours brings about crystallite particle size reduction to less than about 40 nm with accompanying chemical changes such that the resulting material no longer exhibits, as in X-ray diffraction examination, the separate initial characteristics of the individual component compounds, but, although retaining major aspects of the transition metal fluoride, takes on the character of a new, highly electrochemically active material, termed herein as the transition metal fluoride:carbon (TMFC) nanoamalgam.

Initial development of the invention centered upon the use of commercial iron trifluoride ($FeF_3$) and battery grade carbon black. Early combinations of these basic components comprised equal weight ratios in a conservative approach toward ensuring sufficient electronic conductivity. The remarkable performance observed upon evaluation of the resulting TMFC nanoamalgams, however, suggested that a shift to combinations of lesser carbon might be appropriate in order to yield greater specific cell capacity while retaining other desirable aspects of cell performance. Such variations to about 5% carbon proved successful, and further extensive testings of high quality cells were conducted with TMFC nanoamalgam electrode material prepared at about 15% carbon.

Electrochemical characterization of rechargeable cells prepared with TMFC nanoamalgam positive electrode materials generally utilized standardized cell compositions and components, following for the most part the procedures of electrode fabrication described in U.S. Pat. No. 5,460,904, the disclosure of which is incorporated herein by reference. In this respect, about 40 parts by weight of a TMFC nanoamalgam active material, 20 parts polyvinylidene:hexafluoropropylene copolymer (e.g., Kynar Flex 2801 PVdF:HFP), 8 parts Super P conductive carbon, and 32 parts dibutyl phthalate (DBP) plasticizer were thoroughly mixed in sufficient acetone to provide a coatable paste which was cast to a film of about 0.3 mm thickness from which positive electrode members were cut. Test battery cells were prepared by extracting DBP from the positive electrode member with ether and assembling that member in a stainless steel coin cell with a lithium metal/stainless steel negative electrode member, an interposed borosilicate glass paper separator member, and an electrolyte solution, e.g., $LiPF_6$ in EC:DMC or $LiBF_4$ in PC solvent. Electrochemical testing of cells was conducted in the usual manner with commercial automated, computer-controlled cycling and recording equipment.

The following exemplary TMFC nanoamalgam electrode material preparation and cell testing procedures and results will provide further detailed description of the invention for the skilled technician and will enable additional non-inventive variations to be investigated.

EXAMPLE I

Charges of equal parts by weight of $FeF_3$ and carbon black were milled in the high energy impact mill under a helium atmosphere for varying lengths of time before samples were extracted for structural and electrochemical characterization. As a basis for comparison, a measure of $FeF_3$ was thoroughly mixed under shear grinding conditions in a mortar and pestle with an equal amount of carbon black to yield an electrode material mixture which duplicated in significant respects that of Arai et al., noted above, and is designated in the indicated test results and accompanying drawing as the "no mill" sample.

Figure 3:
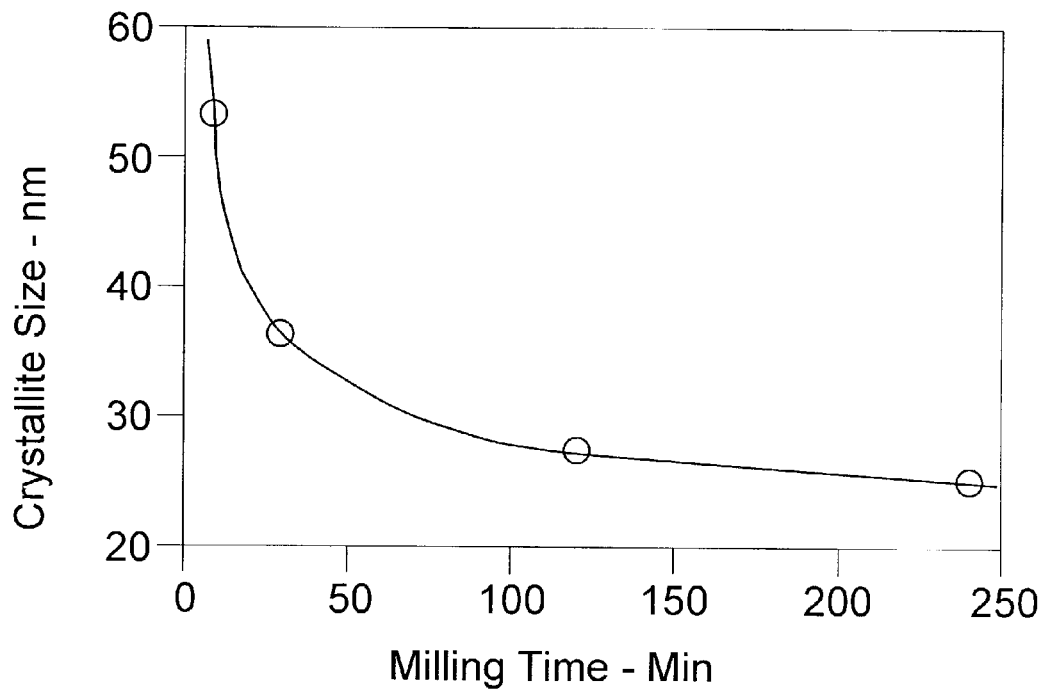
FIG. 3 is a graph plotting the variation in crystallite size of transition metal fluoride:carbon nanoamalgam material as a function of duration of such milling.

Samples of TMFC nanoamalgams and the base reference mixture were characterized in laboratory XRD apparatus to obtain the traces represented in FIG. 1. There the changes in crystalline compound structure are apparent from the "no mill" mixture of $FeF_3$ and carbon through the initial formation of TMFC nanoamalgam at about 10 min milling to the more extensive reformation at about 4 h milling time at which, while the core structure of $FeF_3$ remains stable as indicated by the (012) Bragg peak, the appearance of the (110) peak signals significant development of $FeF_2$. Closer examination of the XRD traces reveals a systematic broadening of the major (012) peak which confirms a substantial reduction of TMFC amalgam crystallite size well into the nanostructure range below about 25 nm. Employing the XRD traces and the Scherrer formula, crystallite sizes were calculated to have systematically decreased from about 110 nm for the no mill mixture to the 25 nm nanostructure range after about 4 h milling, as depicted in FIG. 3. Additional milling appeared to have little significant effect in further reducing crystallite size, but promoted development of other compound forms, such as additional $FeF_2$ due to defluorination of the original precursor.

Figure 4:
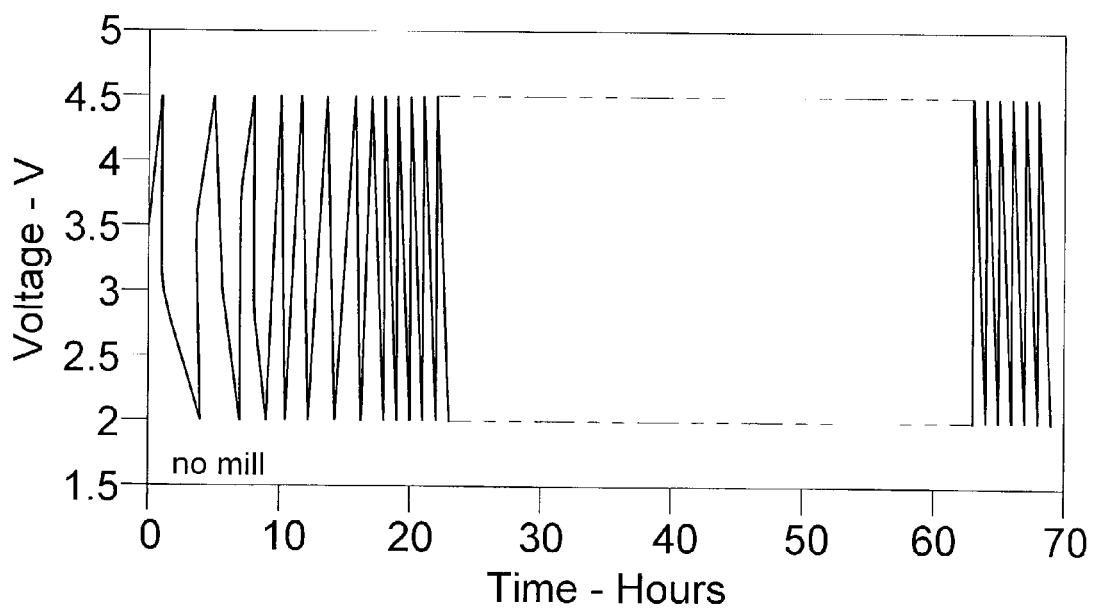
FIG. 4 is a graph plotting the characteristic profile of recycling voltage between 4.5 V and 2.0 V at 22° C. over a cycling period of about 70 hours in a cell having a positive electrode comprising a simple, unmilled mechanical mixture of nanostructure transition metal fluoride and carbon particles.
Figure 5:
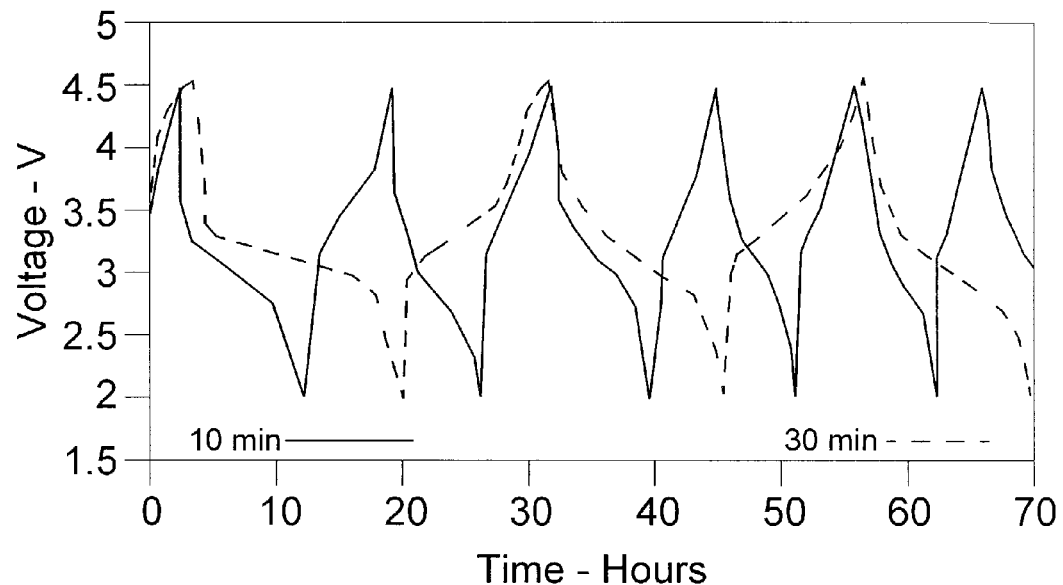
FIG. 5 is an overlay graph plotting the characteristic profiles of recycling voltage between 4.5 V and 2.0 V at 22° C. over a cycling period of about 70 hours in cells embodying the present invention and comprising transition metal fluoride:carbon nanoamalgam material obtained from high energy impact milling for 10 and 30 minutes, respectively.
Figure 6:
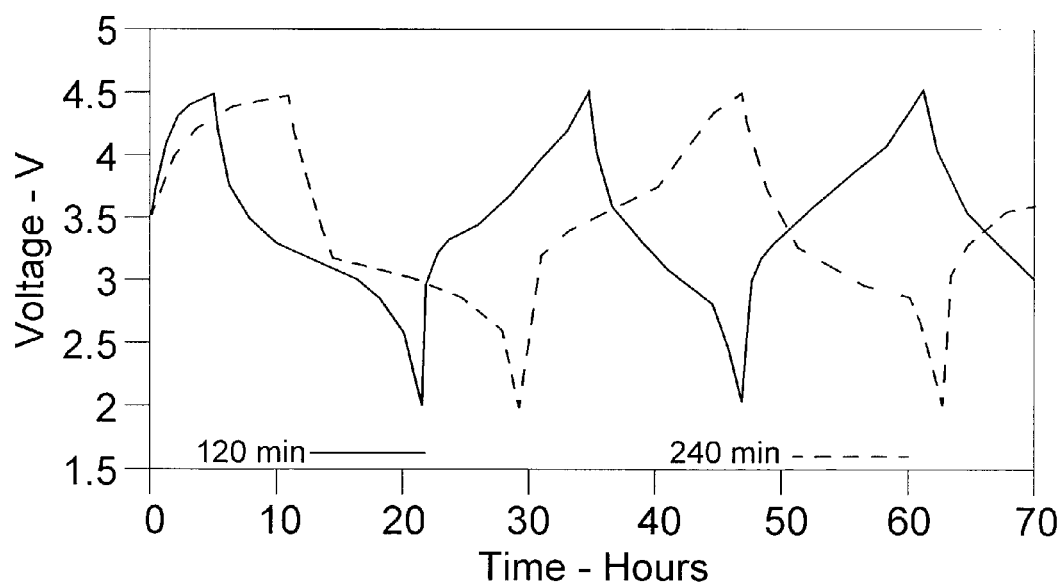
FIG. 6 is an overlay graph plotting the characteristic profiles of recycling voltage between 4.5 V and 2.0 V at 22° C. over a cycling period of about 70 hours in cells embodying the present invention and comprising transition metal fluoride:carbon nanoamalgam material obtained from high energy impact milling for 120 and 240 minutes, respectively.
Figure 7:
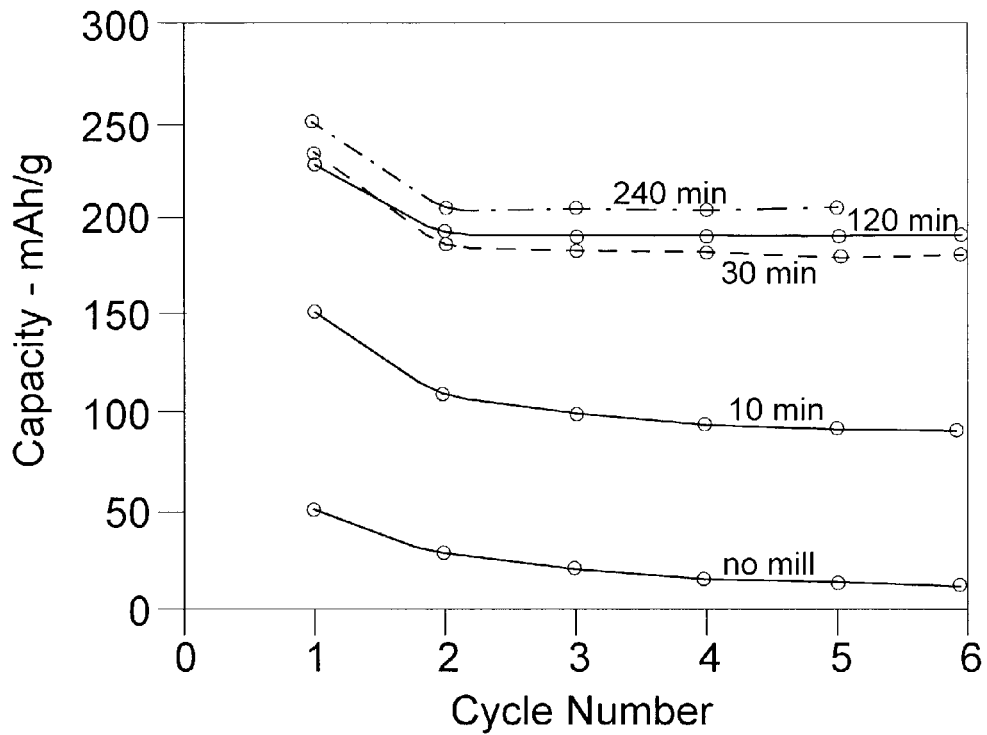
FIG. 7 is an overlay graph plotting the variation in cell specific capacity over the indicated cycling period in the cell embodiments of FIGS. 4-6.
Figure 8:
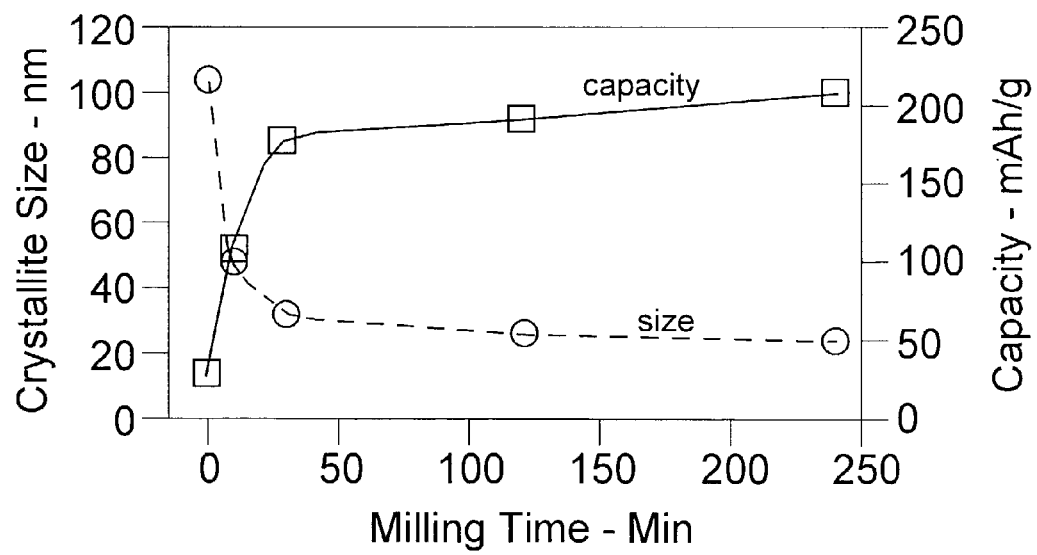
FIG. 8 is an overlay graph plotting the comparative variations in transition metal fluoride:carbon nanoamalgam crystallite size and cell specific capacity as a function of high energy impact milling time in cells comprising one embodiment of the present invention.

For characterization of the electrochemical efficacy as electrode materials of the range of TMFC nanoamalgams obtained above, a series of cells was fabricated in the above-described manner and tested at room temperature (22° C.) over a period of time at constant amperage cycles of 22 mA/g between 4.5 and 2.0 V. The substantially insignificant and unstable maximum capacity of about 50 mAh/g for the "no mill" electrode material mixture may be seen in the cycling charge/discharge voltage trace of FIG. 4. The results of similar testing for TMFC nanoamalgams of 10 and 30 min milling times are shown in FIG. 5, while the results obtained from 120 and 240 min milled materials appear in FIG. 6. The outstanding effect of the impact milled nanostructure particle size may be seen in the comparative discharge capacities of the various electrode materials over test period segments of 6 cycles are depicted in FIG. 7. An additional depiction of the effect of the reduction in nanoamalgam electrode material crystallite size upon discharge capacity of cells comprising such materials is shown in FIG. 8.

EXAMPLE II

Figure 9:
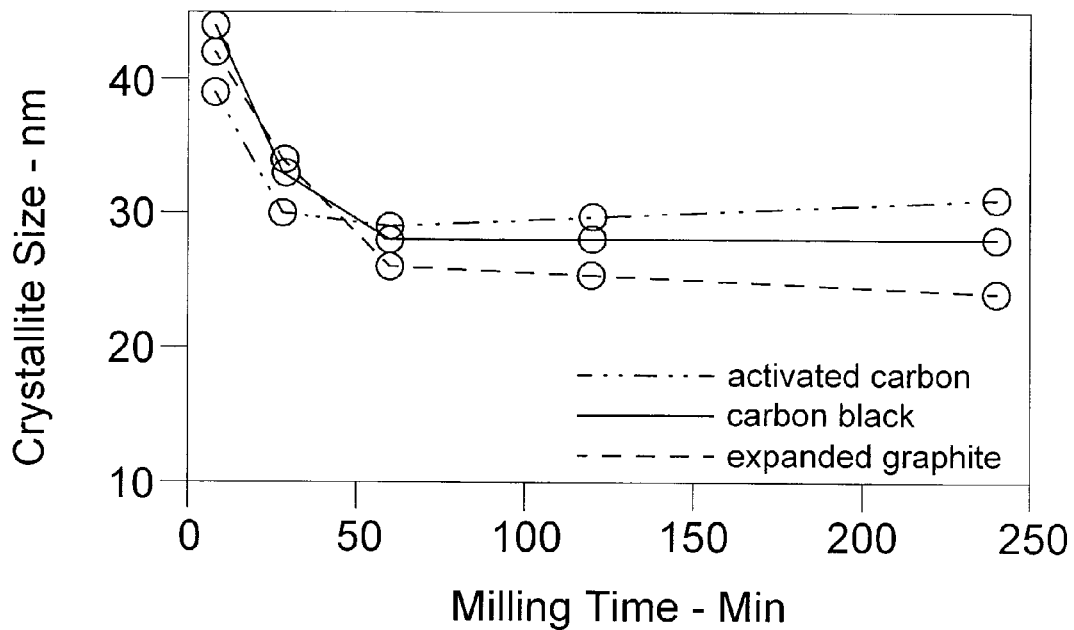
FIG. 9 is an overlay graph plotting the comparative variations in transition metal fluoride:carbon nanoamalgam crystallite size as a function of high energy impact milling time for nanoamalgams comprising various carbon types.
Figure 10:
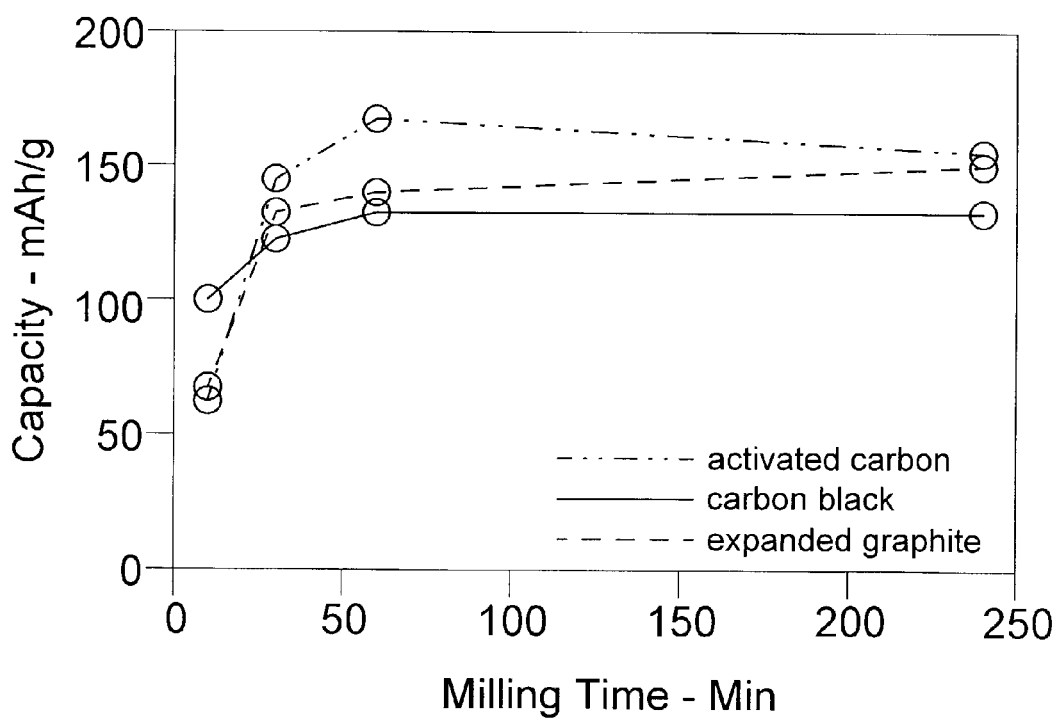
FIG. 10 is an overlay graph plotting the comparative variations in cell specific capacity as a function of high energy impact milling time of transition metal fluoride:carbon nanoamalgam cell electrode material comprising various carbon types.

A series of TMFC nanoamalgams was prepared from combinations of 85 parts by weight of $FeF_3$ and 15 parts of carbons of different composition and morphology. Exemplary carbon precursors utilized were an activated carbon (Norit) of microstructure dimension having a surface area of about 1700 m²/g, a Super P conductive graphene chain carbon black (NMM Carbon), and an acid treated expanded graphite (Superior Graphite) having reduced particle size and partial exfoliation. Although some variations in the obtained TMFC nanoamalgam particle sizes were observed, as shown in FIG. 9, presumably as a result of the impact-tempering effect of the original carbon morphology, XRD and TEM examinations of these materials confirmed the characteristic nanostructure exhibited by the earlier sampled amalgams. Electrochemical characterization of the TMFC nanoamalgams was carried out with lithium cells prepared in the foregoing manner and comprising $LiPF_6$/EC:DMC electrolyte. These cells were tested over extended cycles at room temperature and a cycle rate of C/22 (7.58 mA/g) between 4.5 and 2.5 V with substantially the same remarkable capacity level and stability obtained with the previous nanoamalgam electrode materials. Comparative third cycle discharge capacities and the effect of milling time are shown in FIG. 10. Baseline capacities obtained with electrode materials comprising "no mill" carbon mixtures were consistently well below 50 mAh/g.

EXAMPLE III

Figure 11:
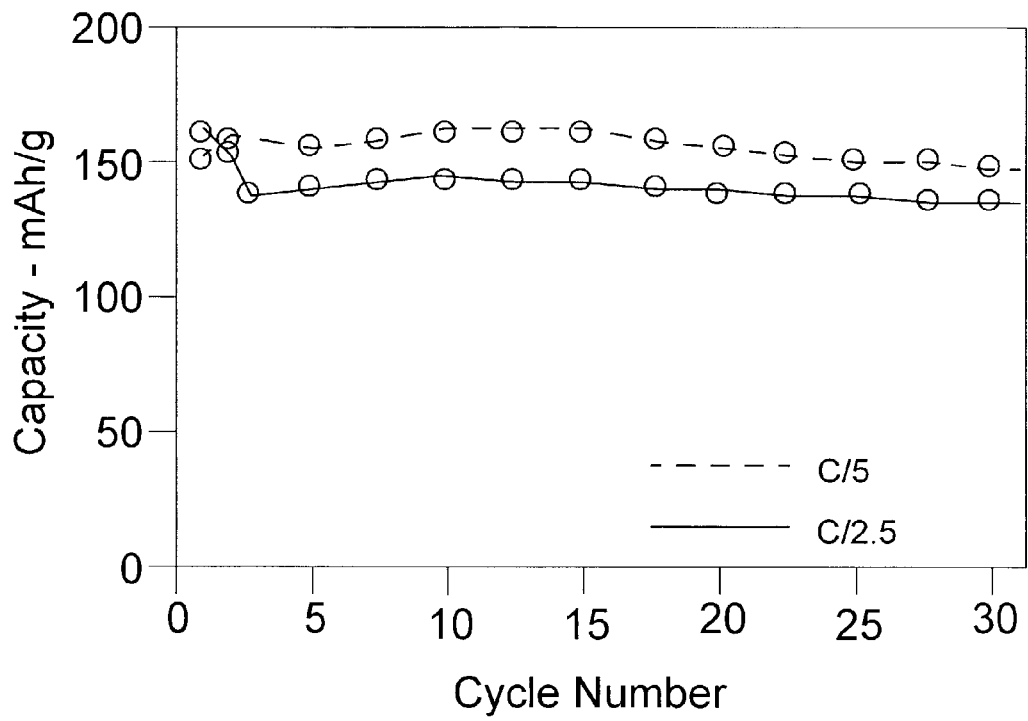
FIG. 11 is an overlay graph plotting the comparative variations in cell specific capacity over the indicated number of cycles as a function of cycling rate in cells embodying a transition metal fluoride:carbon nanoamalgam cell electrode material of the present invention.

In order to evaluate the novel TMFC nanoamalgam electrode materials of the present invention under cycling conditions more consistent with practical usage, a 60 min milled 85:15 $FeF_3$:activated carbon nanoamalgam was prepared and used to fabricate a test cells as in Ex. II. The cells were then cycled repeatedly at 22° C. between 4.5 and 2.5 V at rates of 22.7 mA/g (C/5) and 68.18 mA/g (C/2.5), respectively, after two initializing cycles at 7.58 mA/g. Resulting exceptionally stable discharge capacities, as shown in FIG. 11, remained in the 150 mAh/g range.

EXAMPLE IV

Test cells were prepared as in Ex. III comprising electrolytes of $LiPF_6$/EC:DMC:PC:EMC and $LiBF_4$/PC, in addition to the $LiPF_6$/EC:DMC of Ex. III. The cells were cycled in similar manner at the rate of 22.7 mA/g (C/5) for about 50 cycles. The results were substantially the same as obtained at that rate in Ex. III, the $LiBF_4$/PC electrolyte exhibiting a somewhat greater capacity stability, while the $LiPF_6$/EC:DMC:PC:EMC combination faired slightly less well.

EXAMPLE V

Figure 12:
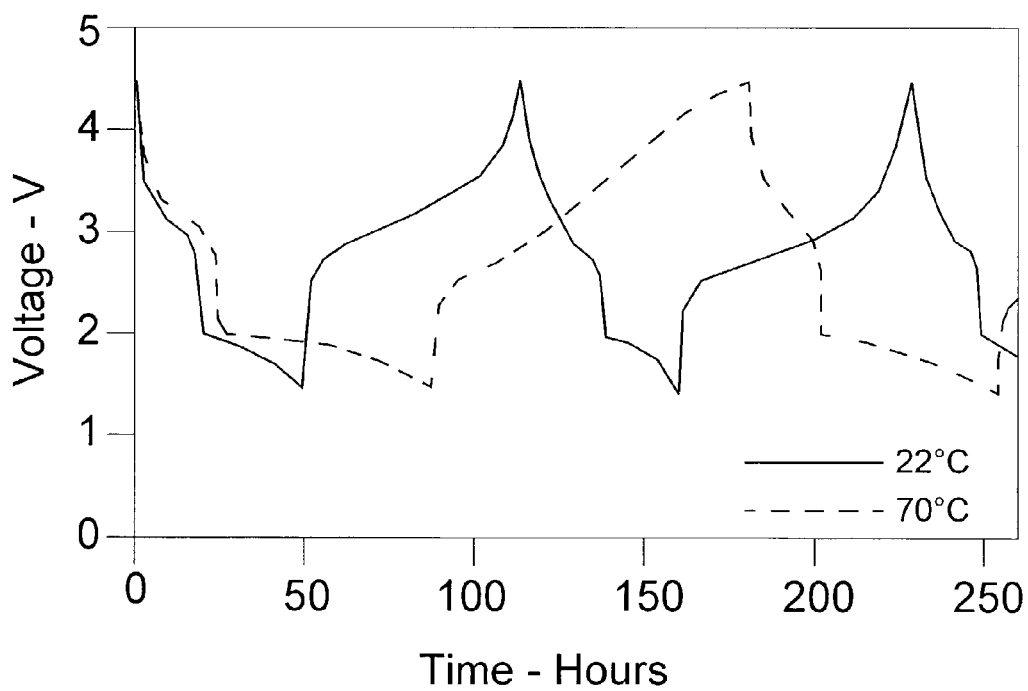
FIG. 12 is an overlay graph plotting the respective characteristic profiles of recycling voltage between 4.5 V and 1.5 V at 22° C. and 70° C. over a cycling period of about 250 hours in cells embodying a transition metal fluoride:carbon nanoamalgam cell electrode material of the present invention.

Further examination of a cell of the invention as prepared in Ex. III revealed the surprising capability of TMFC nanoamalgam electrode materials to support rechargeable cell operation at elevated temperatures over wider voltage ranges than heretofore deemed practical. Such extended operational testing revealed exceptional, stable discharge capacity of about 560 mAh/g, nearly 80% of the theoretical capacity achievable in a complete 3 $e^-$ transfer resulting from complete reduction of $Fe^{3+}$ to $Fe^0$. In such testing, cells of Ex. III were cycled at the rate of 7.58 mA/g at 22° C. and 70° C. between 4.5 and 1.5 V. The resulting comparative profiles of cycling voltage shown in FIG. 12 reflect the surprising increase in capacity obtainable with the electrode materials of the present invention.

EXAMPLE VI

Figure 13:
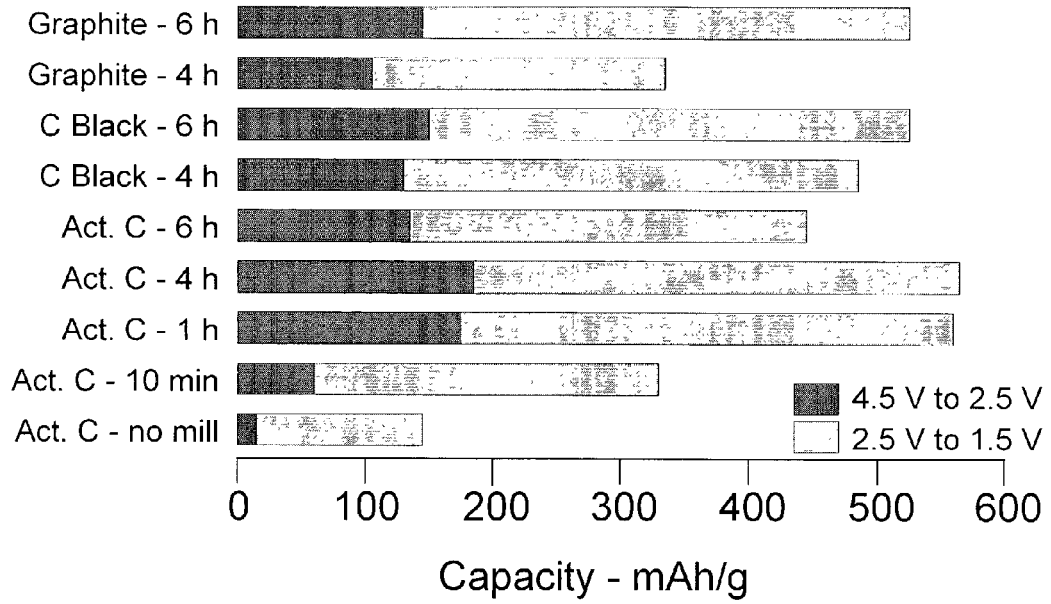
FIG. 13 is a chart depicting comparative third cycle discharge capacities as a function of carbon type and high energy impact milling time and of discharge voltage spans between 4.5 V and 2.5 V and between 2.5 V and 1.5 V at 70° C. in cells embodying $FeF_3$:carbon nanoamalgam cell electrode materials of the present invention.
Figure 14:
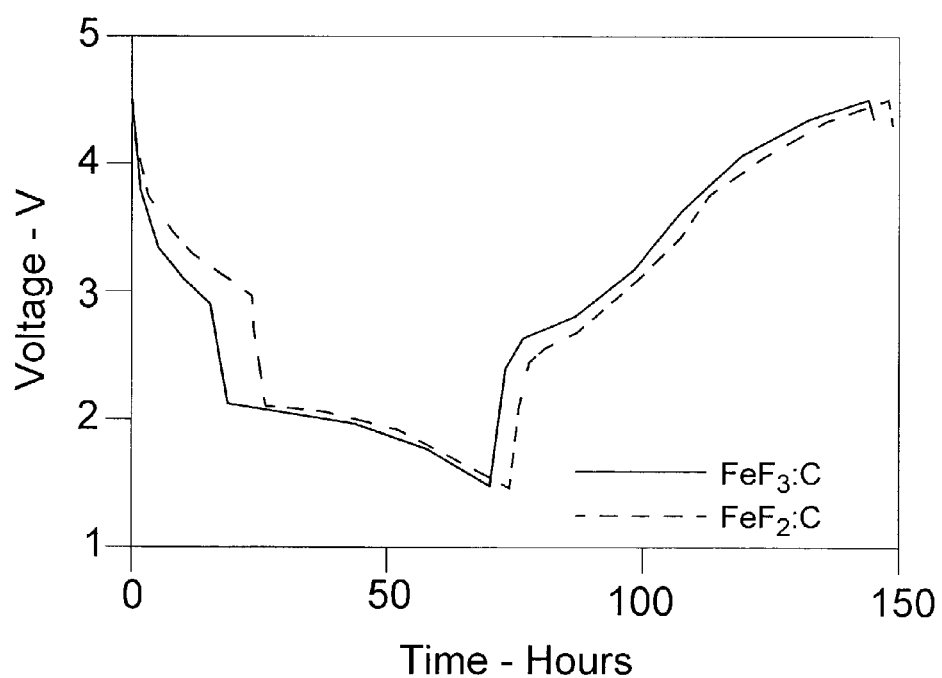
FIG. 14 is an overlay graph plotting the respective characteristic profiles of recycling voltage between 4.5 V and 1.5 V at 70° C. over a cycling period of about 150 hours in cells comprising varying embodiments of transition metal fluoride:carbon nanoamalgam cell electrode materials of the present invention.

A series of cells was prepared as in Ex. II with $FeF_3$ TMFC nanoamalgam electrode materials varying in carbon type and milling time. The cells were cycled at 70° C. as in Ex. V with the discharge capacities over the 4.5 to 2.5 V and the 2.5 to 1.5 V segments of the third cycle being determined. The comparative extraordinary discharge capacities obtained with the nanoamalgams of the invention are shown in FIG. 13.

EXAMPLE VII

Cells were prepared varying in carbon type and milling time as in Ex. VI, but utilizing a different transition metal fluoride, namely $FeF_2$, with the 15% carbon component to provide the TMFC nanoamalgam electrode materials. The cells were tested in the manner of Ex. VI with substantially similar high capacity performance results, as shown in the second cycle voltage profiles of respective cells comprising activated carbon TMFC nanoamalgam electrode materials.

EXAMPLE VIII

Figure 15:
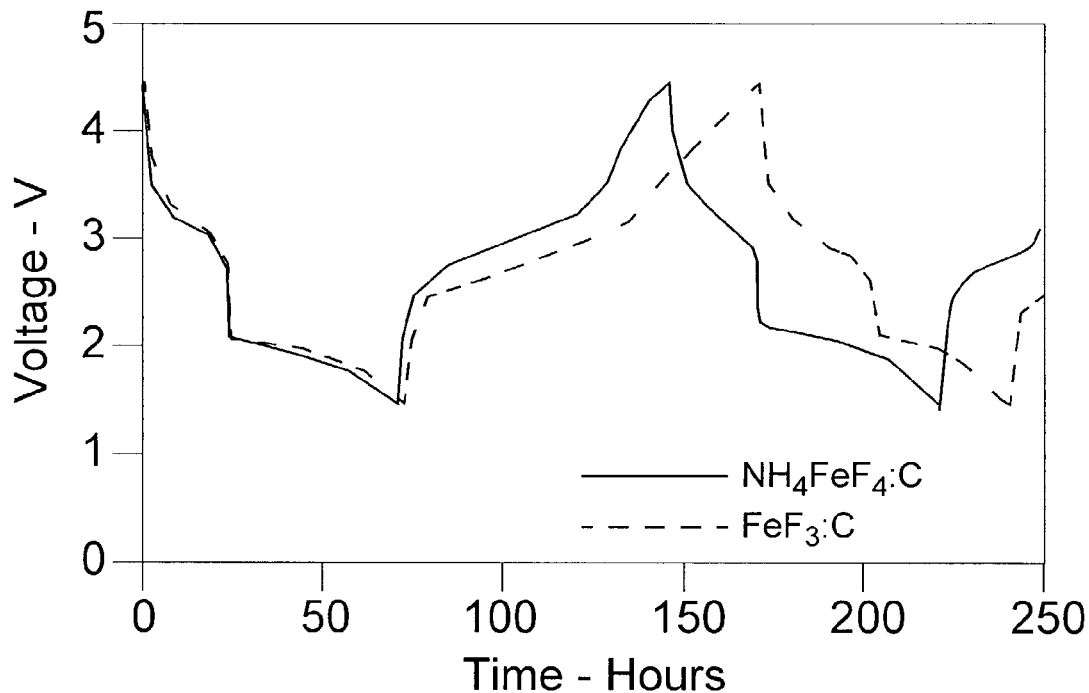
FIG. 15 is an overlay graph plotting the respective characteristic profiles of recycling voltage between 4.5 V and 1.5 V at 70° C. over a cycling period of about 250 hours in cells comprising other varying embodiments of transition metal fluoride:carbon nanoamalgam cell electrode materials of the present invention.
Figure 16:
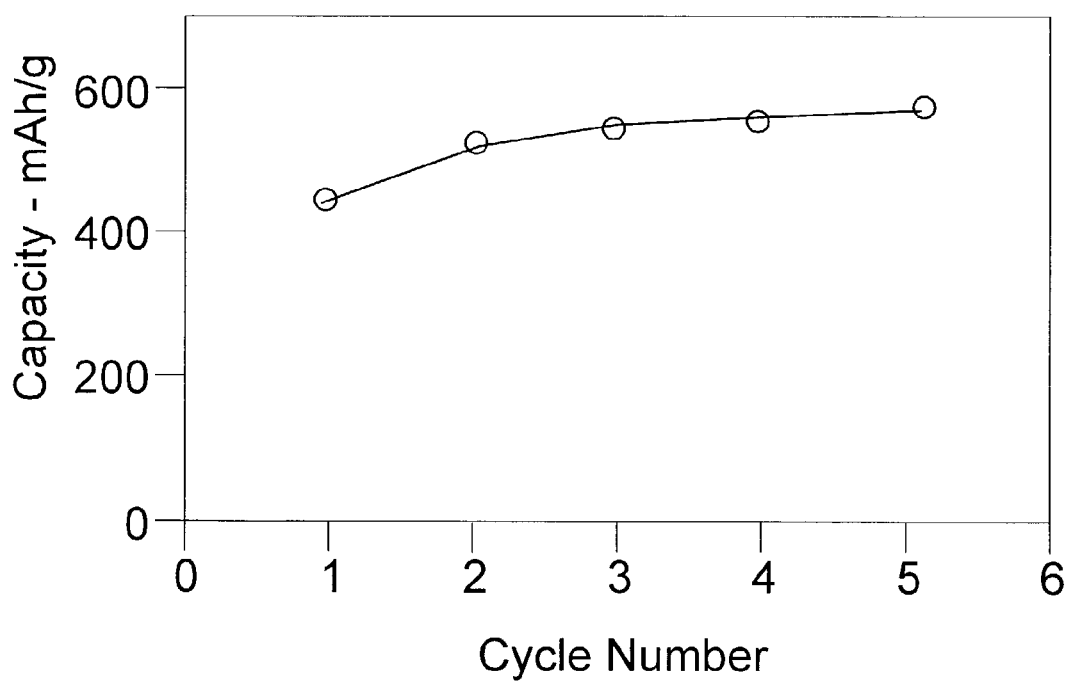
FIG. 16 is a graph plotting variations in cell specific capacity over the indicated number of cycles in a cell embodying the substituted metal fluoride:carbon nanoamalgam cell electrode material of FIG. 15.

The implementation of the present invention in TMFC nanoamalgams derived from other transition metal fluoride compounds was confirmed in the preparation of such an electrode material from $NH_4FeF_4$ and activated carbon. The $NH_4FeF_4$ component was prepared by grind/mixing together an 8:1 molar ratio of ammonium fluoride (NHF) and iron oxalate ($FeC_2O_4.H_2O$) and heating the mixture in an alumina crucible at about 400° C. in air for about 20 min with subsequent grinding and reheating for an additional 10 min. A TMFC nanoamalgam was prepared in the manner of the foregoing examples by 60 min high energy impact milling with 15% activated carbon. Cells of $FeF_3$ and $NH_4FeF_4$ TMFC nanoamalgam electrode materials were prepared with $LiPF_6$/EC:DMC electrolyte and cycled as in Ex. VI. The comparative voltage profiles shown in FIG. 15 confirm the electrochemical efficacy of the derivative electrode material. The exceptional stability of the high discharge capacity of the $NH_4FeF_4$ TMFC nanoamalgam cell over a number of cycles is shown in FIG. 16.

EXAMPLE IX

Figure 17:
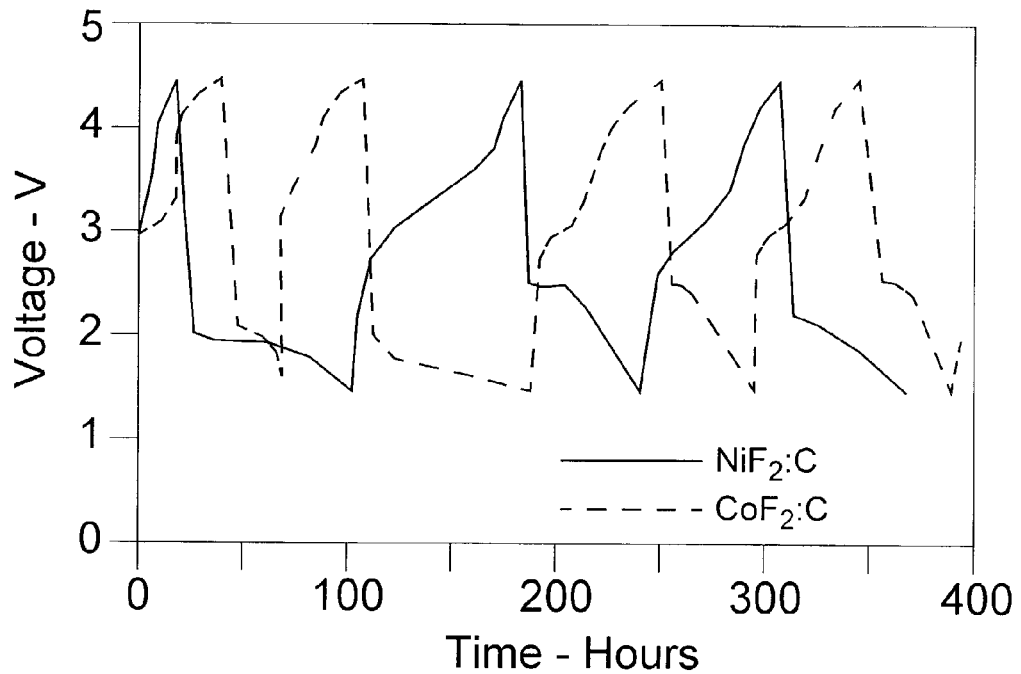
FIG. 17 is an overlay graph plotting the respective characteristic profiles of recycling voltage between 4.5 V and 1.5 V at 70° C. over a cycling period of about 400 hours in cells comprising yet other varying embodiments of transition metal fluoride:carbon nanoamalgam cell electrode materials of the present invention.
Figure 18:
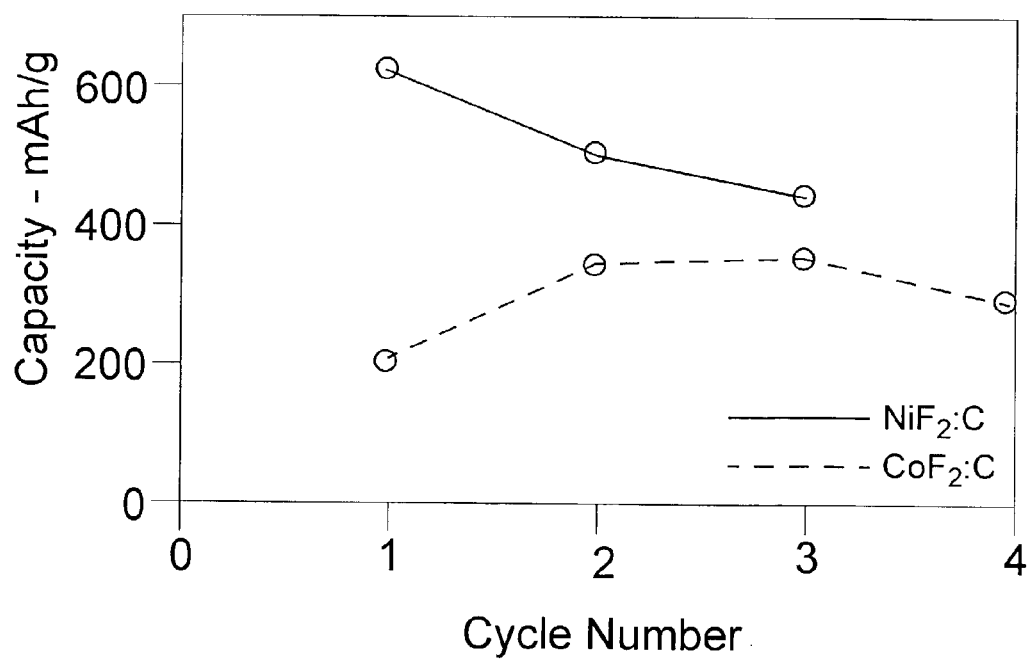
FIG. 18 is a graph plotting variations in cell specific capacity over the indicated number of cycles in cells embodying the transition metal fluoride:carbon nanoamalgam cell electrode materials of FIG. 17.

The utility of other transition metal fluorides in the present invention was confirmed in TMFC nanoamalgam electrode materials prepared from $NiF_2$ and $CoF_2$. Preparation of the electrode materials and test cells followed the processing of Ex. VIII with 15% activated carbon compositions and 60 min milling. Similar cycling over the 4.5 to 1.5 V range at 70° C. provided the comparative voltage profiles shown in FIG. 17 with respective discharge capacities shown in FIG. 18.

It is anticipated that other embodiments and variations of the present invention will become readily apparent to the skilled artisan in the light of the foregoing description and examples, and such embodiments and variations are intended to likewise be included within the scope of the invention as set out in the appended claims.

What is claimed is:

1. An electrochemical cell comprising a negative electrode member and a positive electrode member, said positive electrode member comprising a nanoamalgam of a transition metal fluoride compound and carbon, the nanoamalgam having a metal fluoride crystallite size less than 100 nm.

2. The electrochemical cell according to claim 1, wherein said transition metal fluoride compound of said nanoamalgam is derived from a first row transition metal.

3. The electrochemical cell, according to claim 2, wherein said transition metal is selected from the group consisting of Fe, Ni, and Co.

4. The electrochemical cell, according to claim 1, wherein said transition metal fluoride compound is selected from the group consisting of $FeF_2$, $FeF_3$, $NiF_2$ and $CoF_2$.

5. The electrochemical cell, according to claim 1, wherein said transition metal fluoride compound has the general formula $(NH_4)_x Me_y F_z$, where Me is a transition metal, $1 \leq x \leq 4$, $1 \leq y \leq 2$, and $4 \leq z \leq 6$.

6. The electrochemical cell, according to claim 5, wherein said transition metal fluoride compound is $NH_4FeF_4$.

7. The electrochemical cell, according to claim 1, wherein said carbon is selected from the group consisting of carbon black, activated carbon, and graphite.

8. The electrochemical cell, according to claim 1, wherein said carbon comprises about 5% to about 50% by weight of the nanoamalgam.

* * * * *

UNITED STATES PATENT AND TRADEMARK OFFICE
CERTIFICATE OF CORRECTION

PATENT NO. : 7,625,671 B2  
APPLICATION NO. : 10/261863  
DATED : December 1, 2009  
INVENTOR(S) : Glenn G. Amatucci It is certified that error appears in the above-identified patent and that said Letters Patent is hereby corrected as shown below:

In the specification

Column 1, line 4, insert:

--GOVERNMENT RIGHTS  
This invention was made with federal government support. Consequently, the government has certain rights in the invention.--

Signed and Sealed this  
Thirty-first Day of May, 2016

Michelle K. Lee  
*Director of the United States Patent and Trademark Office*